US012764538B2

(12) United States Patent
Brun et al.

(10) Patent No.: US 12,764,538 B2
(45) Date of Patent: Oct. 13, 2026

(54) REAL-TIME ALERTING ON CYBERSECURITY ATTACKS TARGETING AIRCRAFT INFLIGHT ENTERTAINMENT AND COMMUNICATIONS CONNECTIVITY SYSTEMS

(71) Applicant: Thales Avionics, Inc., Irvine, CA (US)

(72) Inventors: Arnaud Brun, Sainte Colombe en Bruilhois (FR); Nicolas Floquet, Martignas-sur-Jalle (FR)

(73) Assignee: Thales Avionics, Inc., Irvine, CA (US)

( * ) Notice: Subject to any disclaimer, the term of this patent is extended or adjusted under 35 U.S.C. 154(b) by 156 days.

(21) Appl. No.: 18/648,916

(22) Filed: Apr. 29, 2024

(65) Prior Publication Data

US 2025/0338127 A1 Oct. 30, 2025

(51) Int. Cl.
*H04W 12/121* (2021.01)

(52) U.S. Cl.
CPC ................................ *H04W 12/121* (2021.01)

(58) Field of Classification Search
CPC . H04W 12/121; H04N 21/2146; H04H 20/62; H04B 7/18506; H04B 7/18508
See application file for complete search history.

(56) References Cited

U.S. PATENT DOCUMENTS 8,699,403 B2 * 4/2014 Lynch ................... H04W 84/12
370/338
9,934,620 B2 * 4/2018 Byrd, Jr. .............. G07C 5/0808
10,206,204 B2 * 2/2019 Lynch ................... H04W 72/23
10,373,404 B2 * 8/2019 Curtis ..................... G07C 5/008
10,532,826 B2 * 1/2020 Wise ........................ F21V 7/048
10,701,405 B2 * 6/2020 Frisco ................ H04B 7/18508
10,861,119 B2 * 12/2020 Keen .................. G06Q 30/0241
11,402,913 B1 * 8/2022 Tchon .................... B64D 45/00
11,715,387 B2 * 8/2023 Delisle ..................... G09B 9/24
434/32
2011/0219121 A1 9/2011 Ananthanarayanan et al.
2016/0234281 A1 8/2016 Padmanabhan et al.
2017/0041296 A1 2/2017 Ford et al.
2017/0295031 A1 10/2017 Bush et al.
2018/0232045 A1 * 8/2018 Delisle .................... G06F 30/20
2020/0162434 A1 * 5/2020 Tang ....................... H04L 69/40
2023/0070608 A1 3/2023 Sumien

OTHER PUBLICATIONS

International Search Report and Written Opinion of the International Searching Authority for Application No. PCT/US2025/021077 mailed Jun. 17, 2025, 27 pages.

* cited by examiner

*Primary Examiner* — Hosuk Song
(74) *Attorney, Agent, or Firm* — Connor K. Purks

(57) ABSTRACT

A ground-based in-flight entertainment (IFE) security correlation system performs operations to receive heartbeat notifications periodically communicated from an aircraft-based IFE security observability system while in-flight. The operations further generate a security alert notification responsive to detecting failure to receive a heartbeat notification from the aircraft-based IFE security observability system within a threshold time of last receipt of a heartbeat notification. Related aircraft-based IFE security observability systems are disclosed.

24 Claims, 12 Drawing Sheets

| FIELD | M/O/C | TYPE | FORMAT/ POSSIBLE VALUES | DESCRIPTION | EXAMPLE |
|---|---|---|---|---|---|
| flightInfo | M | FlightInformation | | Flight information from the aircraft current position log file | *Refer to Figure 7* |
| flightStatus | O | String | | The flight status | OPP00009:0009 |

*Note that the M/O/C column has the following meaning: "M" means "mandatory", "O" means "Optional", "C" means "Conditional" (the condition is given if the description column).*

FIG. 6

| FIELD | M/O/C | TYPE | FORMAT/ POSSIBLE VALUES | DESCRIPTION | EXAMPLE |
|---|---|---|---|---|---|
| flighId | M | String | | The flight id (unique per flight) | THNK06_20220923155458 |
| flightNumber | M | String | | The flight number (assigned to a flight by the airline) | A2491A |
| origin | M | String | ICAO format | The flight origin (ICAO airport code for the originating airport that the flight took off from) | MCO |
| destination | M | String | ICAO format | The flight destination (ICAO airport code for the destination airport where the flight land) | ORD |
| timeToDestination | M | Integer | Seconds | The time to destination of this flight | 233 |
| flightPhase | M | String | | The flight phase | CRUISE |
| latitude | M | Number | Degrees | The latitude | 28.086548 |
| longitude | M | Number | Degrees | The longitude | 53.771393 |
| altitude | M | Number | Feet | The altitude | 50.0 |
| heading | M | Number | Degrees | The heading | 53.76043 |
| groundSpeed | M | Number | Knots | The ground speed | 120 |

*Note that the M/O/C column has the following meaning: "M" means "mandatory", "O" means "Optional", "C" means "Conditional" (the condition is given if the description column).*

FIG. 7

| FIELD | M/O/C | TYPE | FORMAT/ POSSIBLE VALUES | DESCRIPTION | EXAMPLE |
|---|---|---|---|---|---|
| message | M | String | | Free text describing the event | 2022-09-27T20:51:20.68+00:00 - DSU1 - loadDrm.sh[20039] - root - 99 - [ERROR] - DRM_DEC "Not ready to start proxy and license server." -NOK |
| filename | M | String | | File name | SecLog_DRM_1 |

*Note that the M/O/C column has the following meaning: "M" means "mandatory", "O" means "Optional", "C" means "Conditional" (the condition is given if the description column).*

FIG. 8

| GENERIC DEFINITION | | | | VALUES FOR NOTIFICATIONS | | |
|---|---|---|---|---|---|---|
| FIELD | TYPE | FORMAT/ POSSIBLE VALUES | DESCRIPTION | M/O/C | SECURITY | HEARTBEAT |
| v | String | "major.minor" | This is the version of the log event format formatted as "major. minor". | M | "1.0" | "1.0" |
| schema | String | | The schema name for the payload. | M | "global/tech" | "rtcms/heartbeat" |
| schemaVersion | String | | This is the version of the "schema" for the payload and follow the semantic versioning. | M | "1.0.0" | "1.0.0" |
| level | Numerical | 50 - FATAL<br>40 - ERROR<br>30 - WARN<br>20 - INFO<br>10 - DEBUG<br>0 - TRACE | The level of this log event:<br>FATAL: critical conditions<br>ERROR: error conditions<br>WARN: warning conditions<br>INFO: informational messages<br>DEBUG: debug-level messages<br>TRACE: developer level | M | 30 | 20 |
| sec | Boolean | "true" or "false" | If set to one, the log is considered as a security log (can be combined with any log type).<br>Default value: false | O | true | false |
| timestamp | String | The timestamp shall be in format following RFC 3339, which is a conformant subset of the ISO 8601 extended format | The exact time at which the log event is produced. | M | "timestamp" | "timestamp" |
| source | Object | | Enclosing object for information related to the source of the event, i.e., the application or service that generated the event. | M | | |
| source.airline | String | | The airline in ICAO standard. | M | "airline" | "airline" |
| source.env | String | | Name of the environment i.e. tail number of the aircraft as the event is generated by onboard software. | M | "tail number" | "tail number" |
| source.id | String | | The unique identifier of the source (e.g., uuid of the application, instanceId for docker and kubernetes environments, hostname for server). | M | "the server name" | "na" |
| source.name | String | | Unique human readable name of the source. | M | "RTCMS" | "RTCMS" |
| source.version | String | | The version of the source. | M | "1.0.0" | "1.0.0" |
| data | Object | | Event log payload, defined by "type". | M | *Refer to Figure 8* | *Refer to Figure 6* |

*Note that the M/O/C column has the following meaning: "M" means "mandatory", "O" means "Optional", "C" means "Conditional" (the condition is given if the description column). "na" means "Not Applicable".*

FIG. 9

```
{
    "v": "1.0",
    "schema": "rtcms/heartbeat",
    "schemaVersion": "1.0.0",
    "level": 20,
    "sec": false,
    "timestamp": "2022-09-27T20:50:20Z",
    "source": {
        "airline": "THL",
        "env": "A249TH",
        "id": "na",
        "name": "RTCMS",
        "version": "1.0.0"
    },
    "data": {
        "flightInfo": {
            "flightId": "THNK06_20220923155458",
            "flightNumber": "A2491A",
            "origin": "MCO",
            "destination": "ORD",
            "timeToDestination": "233",
            "flightPhase": "CRUISE",
            "latitude": 28.086548,
            "longitude": 53.771393,
            "altitude": 50.0,
            "heading": 53.76043,
            "groundSpeed": 120
        },
        "flightStatus": "OPP00009:0009"
    }
}
```

FIG. 10

```
{
    "v": "1.0",
    "schema": "global/tech",
    "schemaVersion": "1.0.0",
    "level": 30,
    "sec": true,
    "timestamp": "2022-09-27T20:51:20Z",
    "source": {
        "airline": "THL",
        "env": "A249TH",
        "id": "server1",
        "name": "RTCMS",
        "version": "1.0.0"
    },
    "data": {
        "message": "2022-09-27T20:51:20.68+00:00 - DSU1 - loadDrm.sh[20033] - root - 99 - [ERROR] - DRM_DEC "Not ready to start
proxy and license server." -NOK",
        "filename": "SecLog_DRM_1"
    }
}
```

FIG. 11

REAL-TIME ALERTING ON CYBERSECURITY ATTACKS TARGETING AIRCRAFT INFLIGHT ENTERTAINMENT AND COMMUNICATIONS CONNECTIVITY SYSTEMS

FIELD

The present disclosure relates to aircraft inflight entertainment systems and monitoring cybersecurity events related to operation of inflight entertainment systems.

BACKGROUND

Modem aircraft include a variety of electronic and computer systems to operate the aircraft and provide inflight entertainment (IFE) services to passengers. Aircraft typically include a satellite communications (SATCOM) system which enables aircraft systems to communicate through satellites and gateways with ground network nodes, such as content servers. Aircraft networks and systems can unexpectedly provide a conduit by which malicious entities, e.g., hackers, can attempt to gain unauthorized access to the onboard and offboard systems. In an attempt to prevent such unauthorize access, aircraft can employ various security controls, such as network firewalls, which attempt to control access to data networks and to prevent unauthorized access to critical and sensitive systems.

Regardless of the efficiency of the security controls in place, the current systems and operations used to monitor the cybersecurity of aircraft, however, do not provide capability to alert airline about on-going cyber-attack during a flight. Conventional aircraft-based cybersecurity operations create raw event log files that record content of log event streams generated by aircraft systems. The raw event log files are accumulated during flight and then downloaded through a removable physical media that is transported off the aircraft by crew or are communicated through WiFi or cellular modem at an airport gate. Because of the size of raw event log files, it has been cost prohibitive to communicate raw event log files through the satellite communication pathway. The analysis of raw event logs files is performed post-flight by a ground-based cyber security operations center (CSOC) which does not allow an airline to react in time to respond to an on-going cyber-attack during a flight. There is therefore a need for systems and methods for providing a real-time alert of attempted breaches and other security events arising with aircraft systems.

SUMMARY

Embodiments of the present disclosure are directed to providing an aircraft-based IFE security observability system and ground-based IFE security correlation system, which may be operated by a ground-based cyber security operations center (CSOC) and configured to trigger more real-time notification alerts to airline carriers about on-going cyber-attacks affecting their aircraft.

Some embodiments of the present disclosure are directed to the aircraft-based IFE security observability system which includes at least one processor and at least one memory storing instructions executable by the at least one processor to perform operations. In one embodiment, the operations extract live flight data from aircraft system like flight phase (e.g., taxi, takeoff, initial climb, cruise) to generate a heartbeat notification. The heartbeat notification is periodically communicated, e.g., every X minutes, through a satellite communication pathway to the ground-based security correlation system. In another embodiment, the operations receive security log event streams from components of an IFE system and/or which are connected to the IFE system. The operations analyze security log event streams to detect pre-defined security meaningful entries, e.g., which satisfy a forwarding condition. Responsive to identifying a security meaningful entry, the operations generate an associated security event notification. The security event notification is communicated through a satellite communication pathway to the ground-based security correlation system.

Some related embodiments of the present disclosure are directed to the operations of the aircraft-based IFE security observability system including to access a configuration file to identify a set of security log event stream modules to be monitored within at least one of: an IFE content server, a passenger display unit, a passenger electronic device, a cabin-crew terminal, a network distribution component, and a satellite connectivity server. The operations receive raw event log data through observability data pipelines data from the set of security log event stream modules. The operations generate heartbeat notifications periodically communicated to a ground-based IFE security correlation system. The operations also generate a security event notification communicated to the ground-based IFE security correlation system, responsive to at least some content of the raw event log data satisfying a forwarding condition.

Some other embodiments of the present disclosure are directed to the ground-based security correlation system which includes at least one processor and at least one memory storing instructions executable by the at least one processor to perform operations. In one embodiment, the operations periodically receive, e.g., every X minutes, heartbeat notifications through a satellite communication pathway from the security observability system. Failure to receive a heartbeat notification for a threshold time since last receipt automatically generates an operational alert to the CSOC. In another embodiment, the operations receive a security event notification through a satellite communication pathway from the security observability system. The operations process an individual security event notification or series of security event notifications to trigger a security alert each time a condition (or set of conditions) match a pre-defined correlation rule. The condition may be based on flight information contained in the last heartbeat notification, for example because aircraft operational data can be important for interpreting a security event notification in view aircraft state. Responsive to identifying a security alert, the operations generate a security alert notification, based on a pre-defined notification that may be contextualized with variables, to concerned airline carriers and/or to the aircraft having the security event and other aircraft that may be at risk of similar events.

Some related embodiments of the present disclosure are directed to the operations of the ground-based IFE security correlation system including to receive heartbeat notifications periodically communicated from an aircraft-based IFE security observability system while in-flight, and to generate a security alert notification responsive to detecting failure to receive a heartbeat notification from the aircraft-based IFE security observability system within a threshold time of last receipt of a heartbeat notification. In a further embodiment, the operations receive at least one security event notification from an IFE security observability system onboard the aircraft, and generate a security alert notification responsive to determining the at least one security alert notification satisfies a security event correlation rule.

Some further embodiments are directed to the CSOC controlling the aircraft-based IFE security observability system and ground-based IFE security correlation system. Campaigns of penetration testing may be organized frequently on physical or virtual test bench representative of the onboard inflight entertainment and connectivity systems. During the testing, a red team (first team) can use the same tools and techniques as real hackers to launch cyber-attacks on test bench on-wing systems whereas a blue team (second team) can evaluate the efficiency of existing security controls processing security raw event logs. The CSOC can be trained to correlate characteristics of reported security event to particular attack characteristics, and to increase accuracy toward ensuring that only a legitimate attack will trigger a security alert (true positive) and so that the security alert notification to the airline will contain an accurate self-explanatory message. Correlation rules or other learning-based operations can be configured (e.g., trained) based on cyber-attack scenarios and associated security raw event logs. In one embodiment, the CSOC can update the configuration of the aircraft-based IFE security observability system via a process called content loading. In another embodiment, the CSOC can update directly and immediately the configuration of the ground-based IFE security correlation system.

Other aircraft-based IFE security observability system and ground-based IFE security correlation system, and related methods, and computer program products according to embodiments of the inventive subject matter will be or become apparent to one with skill in the art upon review of the following drawings and detailed description. It is intended that all such additional embodiments be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 6 illustrates the schema "rtcms/heartbeat" in accordance with some embodiments of the present disclosure;

FIG. 7 illustrates the JSON object "FlightInformation" in accordance with some embodiments of the present disclosure;

FIG. 8 illustrates the schema "global/tech" in accordance with some embodiments of the present disclosure;

FIG. 9 illustrates the various fields defined for the heartbeat and security event notifications in accordance with some embodiments of the present disclosure;

FIG. 10 illustrates an example of heartbeat notification in accordance with some embodiments of the present disclosure;

FIG. 11 illustrates an example of security event notification in accordance with some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Figure 1:
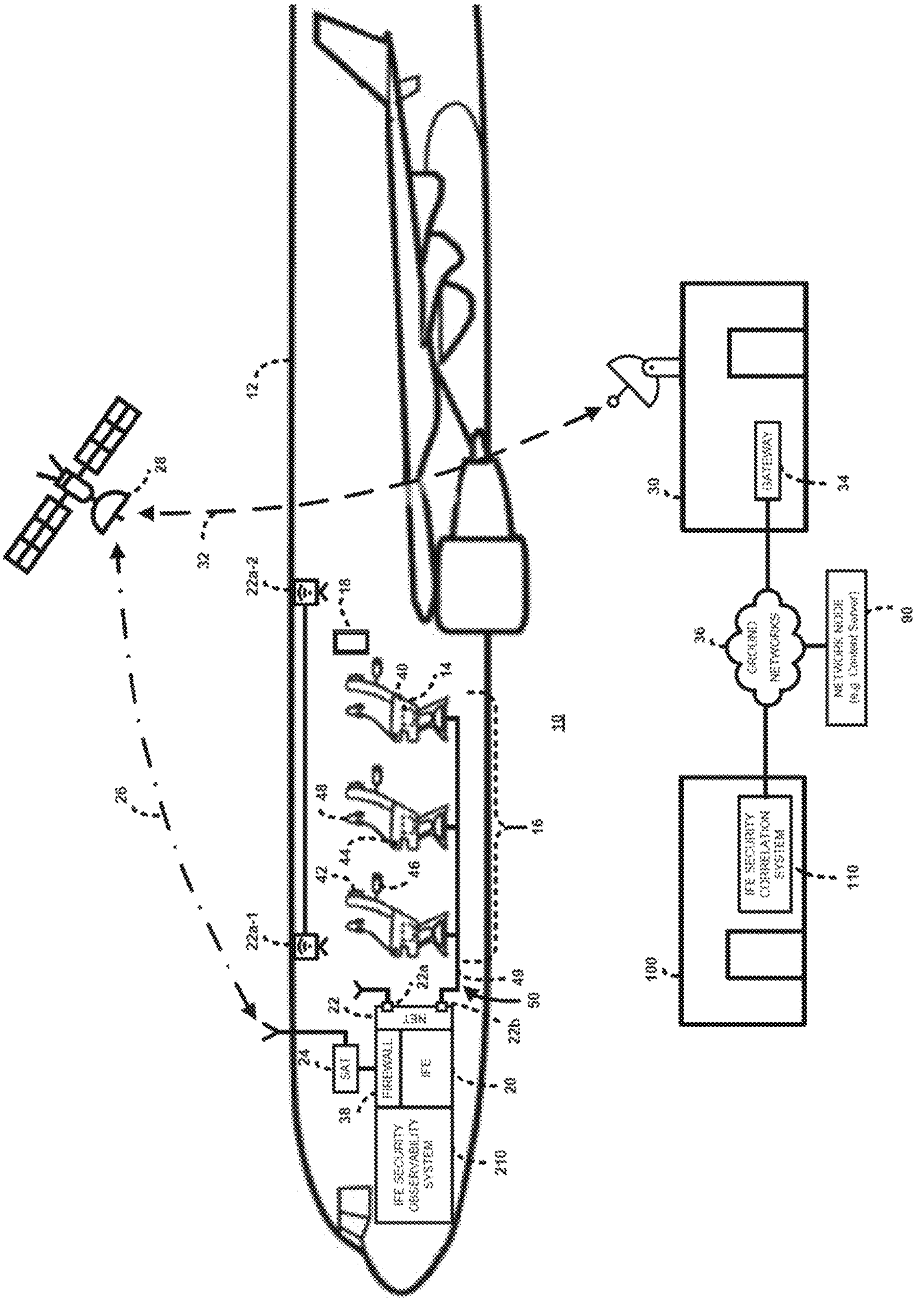
FIG. 1 illustrates example component systems of an aircraft which includes an IFE security observability system that communicates through a satellite network with a ground-based IFE security correlation system operated by CSOC in accordance with some embodiments of the present disclosure.

FIG. 1 illustrates example component systems of an aircraft which includes an IFE security observability system which communicates through a satellite network with a ground-based IFE security correlation system operated by CSOC in accordance with some embodiments of the present disclosure. Within a fuselage 12 of the aircraft 10, there may be seats 14 arranged over multiple rows 16, with each seat 14 accommodating a single passenger. One or more passengers may utilize a portable electronic device (PED) 18 during flight. Example PEDs 18 include smart phones, tablet computers, laptop computers, and other devices that include a processor which executes pre-programmed instructions (e.g., user applications). Although these PEDs are most often brought on board the aircraft 10 by the passengers themselves, airline carriers may also offer them to the passengers for temporary use.

The aircraft 10 incorporates an inflight entertainment and communications (IFE) server 20. One of its components is a data communications network 22. Almost all conventional PEDs 18 have a WLAN (WiFi) module, so the network 22 of the IFE system 20 includes WLAN access points **22*a*, 22*a*-1 and 22*a*-2 spaced apart within the fuselage 12 and connected to the data communications network 22 via, e.g., a wired network such as wired Ethernet. The PED 18, via the onboard WLAN network, may connect to the IFE system 20** to access various services offered thereon such as content downloading/viewing, shopping, and so forth.

The IFE server 20 (also referred to as "IFE system") may also offer Internet access to the connecting PEDs 18. One contemplated modality that operates with the IFE server 20 is a satellite communication transceiver 24 that establishes and maintains a broadband data communications link 26 with a communications satellite 28. The link 26 may use Ku-band microwave transmissions. However, any suitable communications satellite 28, such as Inmarsat or Iridium may also be utilized without departing from the present disclosure including other bands, such as Ka-band, C-band and/or X-band. The communications satellite 28 maintains a broadband data communications link 32 with a satellite gateway 34 operated by a communications service provider 30. Bidirectional broadband data communications are performed between the aircraft satellite communication transceiver 24 and the ground satellite gateway 34 via the links 26 and 32. The ground satellite gateway 34 is connected to ground networks 36, such as public networks (e.g., Internet) and/or private networks. There are numerous types of network nodes 90, e.g., content servers, that are accessible to passengers via the IFE server 20 connected to the satellite 28 and gateway 34. Satellite communication links are a relatively expensive pathway for data traffic.

The PED 18 can connect to the IFE server 20 via one of the WLAN access points **22*a*, 22*a*-1, 22*a*-2 which relays the data transmissions to the satellite communication transceiver 24 for transmission to the communications satellite 28 over the data link 26, and the satellite 28 relays the data to the gateway 34 over the data link 32. The network gateway 34 then routes the transmission to the ground networks 36, e.g., Internet. Data transmissions from network nodes(s) 90 on the Internet to the PED 18 are understood to follow a reverse pathway. Due to the high costs associated with the communications satellite 28 that is passed to the users of the satellite communications, the carrier may use a firewall 38 with controls the flow of data traffic to and from the satellite communication transceiver 24** according to established rules.

Another way in which the passenger can utilize the services offered through the IFE server 20 are individual seat-based equipment which can include a terminal unit 40, a display (e.g., seat video display unit) 42, an audio output 44, and a remote controller (e.g., passenger control unit) 46. For a given row 16 of seats 14, the terminal unit 40 and the audio output 44 are disposed on the seat 14 for which it is provided, but the display 42 and the remote controller 46 may be disposed on the row 16 in front of the seat 14 to which it is provided. For example, the display 42 and the remote controller 46 can be installed on the seatback of the row in front of the seat. This is by way of example only, and other display 42 and remote controller 46 mounting and access configurations such as a retractable arm or the like mounted to an armrest of the seat 14 or by mounting on a bulkhead.

Each passenger can utilize an individual headset 48, supplied by either the airline or by the passenger, which provides a more private listening experience. In the illustrated embodiment, the audio output 44 is a headphone jack that is a standard ring/tip/sleeve socket. The headphone jack may be proximately located to the display 42 or on the armrest of the seat 14 as shown. The headphone jack may be an active type with noise canceling and including two or three sockets or a standard audio output without noise canceling. Alternatively, short-range wireless communication devices such as Bluetooth transceivers may be provided to connect the headset 48 to the terminal unit 40 and/or the display 42. In alternate embodiments, each display 42 may incorporate a terminal unit 40 to form a display unit (e.g., smart monitor).

A common use for the terminal unit 40 installed on the aircraft is the playback of various multimedia content. The terminal unit 40 includes at least one processor configured to decode the data files corresponding to the multimedia content and generates video and audio signals for the display 42 and the audio output 44, respectively. Multimedia content data files may be stored in one or more repositories associated with the IFE server 20, and each of the terminal units 40 for each seat 14 may be connected thereto over a wired local area network link 49 connected to a wired network interface **22*b*, e.g., Ethernet switch or router, or via the WLAN access points 22*a*, 22*a*-1, 22*a*-2**.

In some embodiments, the terminal units 40 initiate a request for multimedia content to the IFE server 20, where such content may be stored. The data is transmitted to requesting terminal unit 40 over the wired local area network link 49, and most data traffic thus remains local. The terminal units 40 may additionally receive content that is streamed (e.g., IPTV) from one of a content server of one of the ground network nodes 90 through the satellite 28 and temporarily buffered by the IFE server 20. There are several additional applications contemplated that may rely upon a connection to the ground networks 36, in which case the data is passed to the satellite communication transceiver 24 so long as permission has been granted therefor by the firewall 38 in the same manner as described above in relation to the WLAN network and the request originating from the PED 18.

Although it is generally assumed that passengers use the onboard systems without malicious-intent, it is foreseeable that a passenger may attempt to access restricted content and/or services for malicious purposes such as obtaining sensitive data (e.g., other passenger login credentials, credit card information, etc.) and disrupting and/or taking control over those services. Moreover, a passenger may attempt to interfere with operation of components of the aircraft systems, such as through a denial-of-service attack of the WLAN access points **22*a*, 22*a*-*l* and 22*a*-2, the wired network 49, etc. Flight-critical avionics systems are physically and logically separated from the onboard local area network 50 carrying passenger data traffic, although some avionics systems may utilize the onboard local area network 50 for operational, administrative, and/or maintenance purposes. Whether done for financial profit or for malicious purpose, attacks against components connected to the onboard local area network 50** are problematic for airline carriers.

Various embodiments of the present disclosure are directed to enabling real-time monitoring, analysis, detection, and alerting actions against attempted breaches and other security events arising with aircraft systems using an aircraft-based IFE security observability system 210 which, in some embodiments, operates to control the amount of data traffic communicated to a ground-based IFE security correlation system 110 operated by cyber security operations center (CSOC) 100 through the satellite 28 and gateway 34. As will be explained in further detail below, the ground-based CSOC 100 controls the configuration of observability data pipelines operated by the aircraft-based IFE security observability system 210 on content of log event streams from components of the aircraft system 200, when generating notifications to be reported to the security correlation system 110.

Observability data pipelines are used to collect, process, and route observability data from components of the aircraft system 200 to the security correlation system 110. Two kinds of observability data pipeline are operated by the aircraft-based IFE security observability system 210: one to generate heartbeat notifications, another one to generate security event notifications. The frequency of the heartbeat notifications can be dynamically adapted by the aircraft-based IFE security observability system 210 following the push of a new configuration from the ground-based CSOC 100, and which can be adapted to perform cost-effective and timely utilization of the satellite communication pathway. In some embodiments, the frequency of security event notifications is increased based on identifying occurrence of on-going cyber-attacks detected during the flight by the aircraft-based IFE security observability system 210. The aircraft-based IFE security observability system 210 may operate to retain in an accessible memory any security event notification(s) and heartbeat notification(s) arising during time durations when no SATCOM connectivity is available and/or when insufficient SATCOM connectivity is available for offboard communications of the notifications to the ground-based IFE security correlation system 110. Retained notification(s) may be delivered to the ground-based IFE security correlation system 110 once the connectivity is reestablished.

When heartbeat notifications are retained in memory awaiting sufficient SATCOM connectivity, the heartbeat notifications may be retrieved from the memory and communicated as-in or may be combined into a single notification that is compacted to reduce the use of transmission resources and/or that includes further information to facilitate processing of the non-timely communication of the heartbeat notifications by the ground-based IFE security correlation system 110. For example, the further information may indicate the cause of delayed communication of the notifications, e.g., indicating loss of SATCOM connectivity or measurements of SATCOM connectivity bandwidth taken during the time duration in which the notifications were retained in memory awaiting communication offboard.

Thus, an operational embodiment can include to retain heartbeat notifications and security event notifications, in an onboard buffer memory, which were generated when no SATCOM connectivity is available for communications to the ground-based IFE security correlation system. The operations can further include, responsive to SATCOM connectivity becoming available, retrieving the heartbeat notifications and security event notifications from the onboard buffer memory and communicating to the ground-based IFE security correlation system. In a further embodiment, the operations combine the retrieved heartbeat notifications into a single notification for communication to the ground-based IFE security correlation system, and include in the single notification an indication of measurements of SATCOM connectivity bandwidth taken during a time duration in which the heartbeat notifications were retained in the onboard buffer memory awaiting communication offboard.

Figure 2:
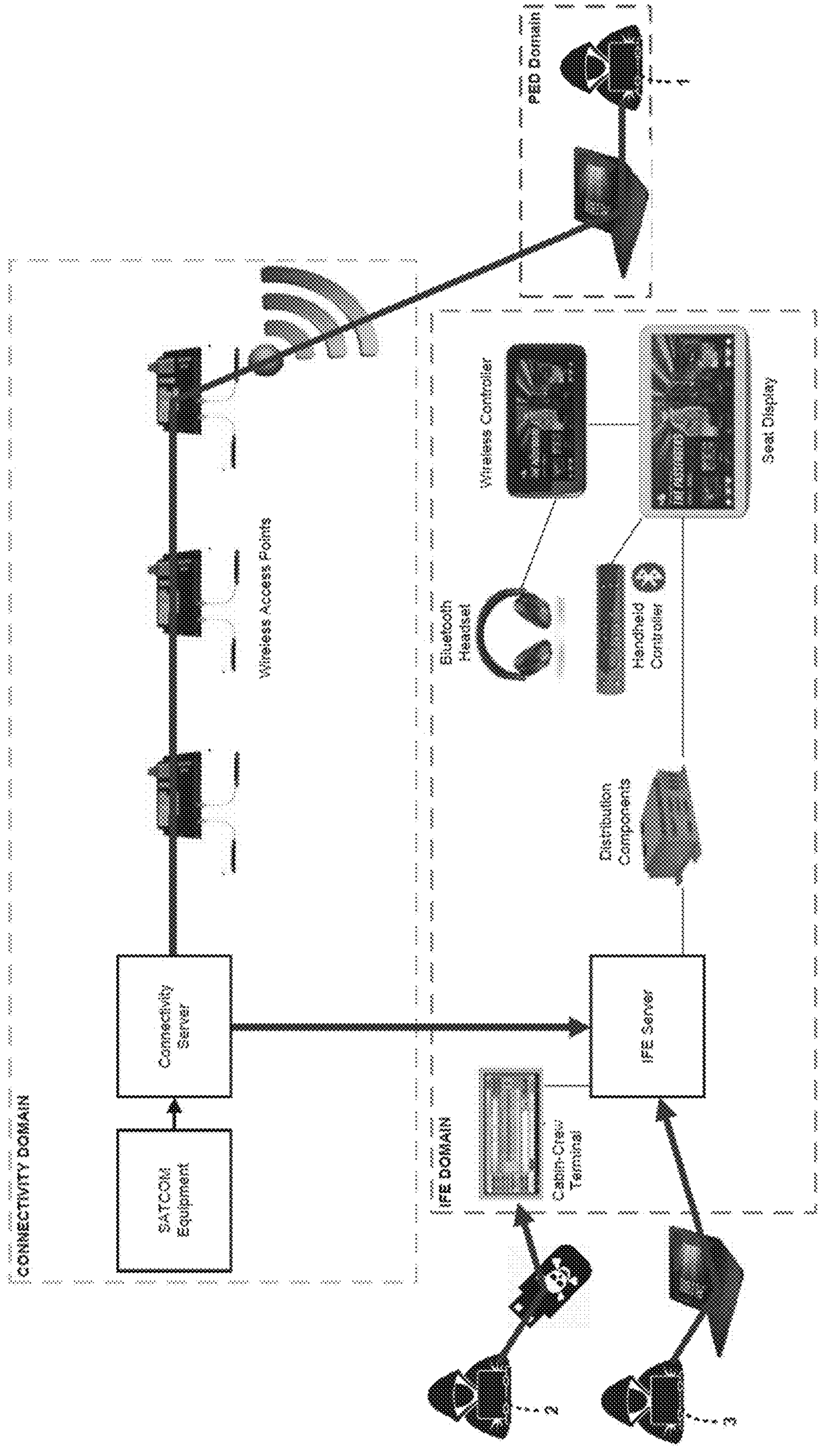
FIG. 2 illustrates example cyber-attack scenarios that can be detected and notified in real-time by the aircraft-based IFE security observability system to the ground-based IFE security correlation system through the satellite communication pathway in accordance with some embodiments of the present disclosure.

FIG. 2 illustrates example cyber-attack scenarios that can be detected and reported in real-time by the aircraft-based IFE security observability system 210 to the ground-based IFE security correlation system 110 through the satellite networks in accordance with some embodiments of the present disclosure.

Referring to FIG. 2, cyber-attack scenario 1 illustrates an attacker attempting to connect a PED to the IFE server via WiFi communications through the aircraft wireless access points which communicate through a connectivity server with the IFE server. The attacker will then launch a brute force attack to gain access to the IFE server. Cyber-attack scenario 2 illustrates an attacker attempting to insert a USB token containing a malware to a USB interface of the cabin-crew terminal to infect the inflight entertainment systems and disrupt the crew operations. Cyber-attack scenario 3 illustrates an attacker attempting to connect a PED to the IFE server via an Ethernet interface to gain unauthorized access to content and/or a service of the IFE server. If the attacker is successful at gaining unauthorized access to the IFE server, the attacker may deploy malicious software which is configured to report to the attacker other passenger credentials (e.g., bank account login credentials, stream service login credentials, etc.), crew access credentials, credit card information, and other sensitive information.

In accordance with various embodiments of the present disclosure, each of the connectivity domain components and IFE domain components can include a security log event reporting module which generates log event streams to the IFE security observability system 210 (FIG. 1) reporting, for example, user access attempts and reporting associated device identifiers and user credentials that were submitted for authentication in an unsuccessful attempt to gain access to components and/or that were submitted in a successful attempt to gain access to components.

Figure 3:
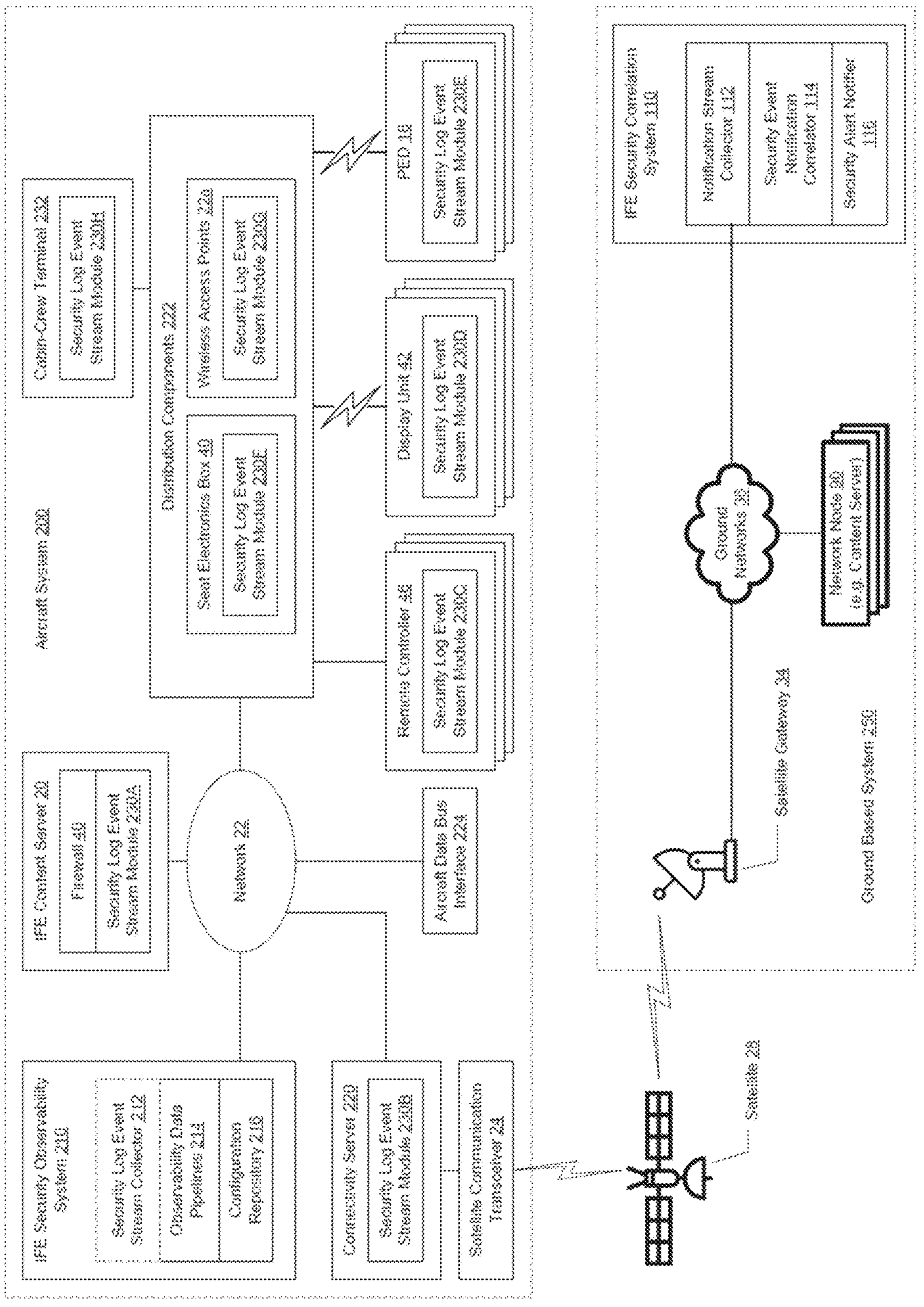
FIG. 3 illustrates a further block diagram of the aircraft and ground systems of FIG. 1 which are configured according to some embodiments of the present disclosure.

FIG. 3 illustrates a further block diagram of the aircraft systems 200 and the ground-based system 250 of FIG. 1 which are configured according to some embodiments of the present disclosure.

Referring to FIG. 3, the aircraft system 200 includes example content delivery devices, such as display units (video display units) 42 and an IFE content server 20, a connectivity server 220, a satellite communication transceiver 24, an aircraft data bus interface 224, and data traffic distribution components 222. Passenger electronic devices ("PEDs") 18 may be passenger owned devices and/or owned by airlines and provided for temporary use by passengers during the duration of a flight. The distribution components 222 communicatively connect service delivery devices, such as the display units 42 and PEDs 18, to other components of the aircraft system 200 through wired communication connections provided by seat electronic boxes 40 (e.g., each mounted to a row of seats) and/or through wireless communication connections provided by wireless access points 22*a* which can be spaced apart along the aircraft cabin. Ground-based computer systems 250 which include various network nodes 90 (e.g., Internet website content servers, airline content servers, etc.) can communicate through ground-based networks 36 (e.g., Internet and/or private networks) the satellite gateway 34 and satellite 28 with the aircraft system 200. Passengers receive content from and may be enabled to communicate with various of the network nodes 90 through the display units 42 and/or the PEDs 18 to browse websites, stream movies, play games, access files, and perform other operations provided by the various network nodes 90.

Example content that can be streamed from the IFE content server 20 can include, but is not limited to, movies, TV shows, audio programs, application programs (e.g. games, news, etc.), informational videos and/or multimedia/textual descriptions (e.g., news, advertisements, and information related to inflight services, destination cites, destination related services, and products). The wireless access points 22*a* may be WIFI access points (e.g. IEEE 802.11, etc.), Bluetooth transceivers, cellular-based access points (e.g. a pico cell radio base station), etc.

The display units 42, the PEDs 18, and/or the remote controllers (passenger control units) 46 can be configured to request and receive content from the IFE content server 20 through wired and/or wireless network connections through the network 22 and/or the distribution components 222. Any number of display units 42, PEDs 18, and remote controllers (passenger control units) 46 may be used with embodiments herein.

In accordance with various embodiments disclosed herein, the aircraft system 200 include an IFE security observability system 210 having at least one processor and at least one memory storing instructions executable by the at least one processor to perform operations including to receive log event streams from security log event stream modules integrated in various components of the aircraft system 200 and/or connected to the aircraft system 200.

In the illustrated example of FIG. 3, a security log event stream generator 230A generates a log event stream based on log events triggered by a firewall 40 connected to the IFE content server 20, and communicates the log event stream to the security log event stream collector 212. Another security log event stream generator 230B generates a log event stream based on log events triggered by a connectivity server 220, which controls communications between components of the aircraft system 200 communicating through the network 22 and the satellite communication transceiver 24, and communicates the log event stream to the security log event stream collector 212. Other security log event stream generators 230C-230E each generate a log event stream based on log events triggered by the remote 46, the display unit 42, and the PED 18, respectively, and communicate the log event stream to the security log event stream collector 212. Other security log event stream generators 230F and 230G each generate a log event stream based on log events triggered by the seat electronics box 40 and the wireless access points 22*a*, respectively, and communicate the log event stream to the security log event stream collector 212. Another security log event stream generator 230H generates a log event stream based on log events observed or triggered by the cabin-crew terminal 232.

The components from which the IFE security observability system 210 can receive log event streams can include, without limitation, a network intrusion detection system, a role-based access control system, a secure shell (SSH) protocol module, antivirus software, access point rouge detection logs, firewall, user authentication services, software integrity monitoring services, network intrusion detection services, etc. Various of these components may be hosted on any one or more of the aircraft systems 200 shown in FIG. 3, including without limitation: a network interface security unit; an IFE content server; a connectivity server; an interactive cabin management terminal; a seat video display unit; a touch passenger media unit; a wireless access point; a seat electronics box; a PED; and other components described above for the aircraft systems 200 of FIG. 3.

The security log event stream collector 212 may operate to create security raw event log files that record content of all security log event streams communicated by security log event stream generators 230A-230H. Content of the security raw event log files may be processed to generate information which characterizes, more compactly, the raw content using logical and/or mathematical analysis of the raw event content over time, e.g., indicating trends, and/or indicating when and/or which defined threshold conditions and/or rules are satisfied by the raw event content.

The security raw event log files can be accumulated during flight and then downloaded through a removable physical media that is transported off the aircraft by crew or communicated through a wireless communication channel, e.g., via WiFi model or cellular modem, at an airport gate. Analysis of the security raw event logs files may then be performed post-flight by ground-based CSOC 100, but which would not allow the airline carrier to react in real-time to security events but instead allow post-flight forensic analysis of the earlier events.

To enable real-time monitoring and analysis of log event streams by the airline carrier and to react in real-time, the security log event stream collector 212 can operate to communicate content of log event streams through aircraft communication connectivity during flight, e.g., via a SATCOM modem, cellular modem, etc. The communicated information may characterize content of the log event streams, and a level of detail in the communicated information may be controlled based on commands from the CSOC 100 and/or on-board operations determining that one or more reporting rules have become satisfied based on risk assessment performed on the log event streams and/or based on content of the log event streams. The content of security raw event log files from a plurality of the security log event stream modules may be compared to identify when a reporting rule is satisfied. Content from security raw event log files from one or more of the security log event stream modules can be aggregated together (e.g., combined in a statistical matter) to generate content for an aggregated log file that is reported to the CSOC 100.

The IFE security observability system 210 operates observability data pipelines 214 depending on the last configuration file available in the configuration repository 216. This configuration file contains settings and options used to control the behavior of the IFE security observability system 210. The aircraft-based IFE security observability system 210 can be configured with a default configuration file, which can be overridden by a new configuration file pushed from a ground-based CSOC 100 in the configuration repository 216.

The observability data pipelines 214 can ingest data from various sources. The configuration file defines where the IFE security observability system 210 should pull data from (e.g., files), and/or how it should receive data pushed to it (e.g., syslog). The observability data pipelines 214 may more often be configured to pull data from files, such as aircraft current position log file or security raw event log files.

In the illustrated example of FIG. 3, for ease of illustration, only one instance of the IFE security observability system 210 is represented which can operate to collect all data. However, any number of IFE security observability system 210 may be deployed in the aircraft system 200. For example, different instances of the IFE security observability system 210 may run on different onboard servers, such as the IFE content server 20 and the connectivity server 220. The software footprint, e.g., memory resource utilization and processing resource utilization, of the IFE security observability system 210 can be low which enables it to be installed in a container (e.g., Docker) or a pod (e.g., Kubernetes) close to sources of security raw event log file.

In accordance with various embodiments disclosed herein, the ground based system 250 include an IFE security correlation system 110 having at least one processor and at least one memory storing instructions executable by the at least one processor to perform operations including to receive notifications generated by the IFE security observability system 210. In the illustrated example of FIG. 3, the notification stream collector 112 running on the ground-based IFE security correlation system 110 centralizes the collection of all heartbeat and security event notifications communicated from aircraft. The notifications from different aircraft can be configured with a common format to simplify their parsing and processing by the IFE security correlation system 110, e.g., using a same overall notification content structure, with common data type definitions and implementation via JSON objects. The notification stream collector 112 can be configured to automatically parse received JSON-formatted notifications to extract relevant information and to categorize the extracted information according to event attributes. Event attributes are the metadata that provide context for events. The notification stream collector 112 indexes event attributes as facets. Facets are used to pivot or filter datasets based on a given attribute.

The security event notification correlator 114 relates a series or group of facets based upon a logical relationship to generate a security alert. To do so, each security alert is triggered by a correlation rule relying on the definition of a search query (e.g., faceted search) and the setting of alert conditions. To illustrate this process, a high-level example is given to trigger a security alert relative to a brute force attack corresponding to cyber-attack scenario 1 from FIG. 2. Assuming that "ifeadmin" and "root" are existing usernames on the targeted system (e.g., SSH daemon) and the attacker tries to guess the password of the "root" user. The search query is composed of facets or terms that are combined into a complex query by using Boolean operators. In this case, the query searches for specific values "Failed password for invalid user ifeadmin" OR "Failed password for root") for the facet name "@action". Then some alert conditions are applied which can include the number of occurrences when authentication has failed during a period of time per "tail number" (i.e. per aircraft). In this example, the number of occurrences is defined as ">49" and the period of time to "1m". This correlation rule when satisfied will automatically trigger a security alert indicating occurrence of a brute force attack, each time more than forty-nine failed authentication attempts are detected in less than one minute.

A correlation rule cannot query information that is not available in the notifications received from aircraft. Findings of a red team (first team) vs blue team (second team) campaign can be used to highlight gaps in detection of some cyber-attack scenarios. To address these and other security detection gaps, the aircraft system 200 can be updated to use new security controls and log new types of security events that are observable to and logged by the security log event stream module. The configuration of the IFE security observability system 210 and the IFE security correlation system 110 is modified accordingly to consider these new security controls and loggings. For example, the configuration repository 216 can be updated to configure the security log event stream collector 212 to record the new loggings of the security log event streams and configure the observability data pipelines 214 for reporting the security log event streams to the ground-based IFE security correlation system 110.

The security alert notifier 116 can operate to generate a security alert notification to the airline carrier each time a security alert is triggered. Each correlation rule is associated with a pre-defined notification contextualized with variables. Security alert notifications are a key component of fleet monitoring that keep the airline carrier informed of the existence of a cyber-attack affecting one of their flight and on-going duration and characteristics of the cyber-attack, and support the airline carrier attack response (remediation) activity. The security alert notification can contain a self-explanatory message that characterizes the nature of the security issue and may contain a severity score that indicates severity of the security issue to identified software and/or components of the aircraft system 200. Based on the information provided, the airline carrier can decide how to react, which may include modifying the configuration of the security log event reporting to provide increased detail in the logged events (e.g., request increased detail and amount of logged data from the security log event steam modules), and/or which may include sending commands to the IFE security observability system 210, the connectivity server 220, the IFE content server 20, the cabin-crew terminal 232, the distribution components 222, and/or other components of the aircraft system 200 to attempt to identify the source of the attack and to reduce or prevent risk of further attack.

Figure 4:
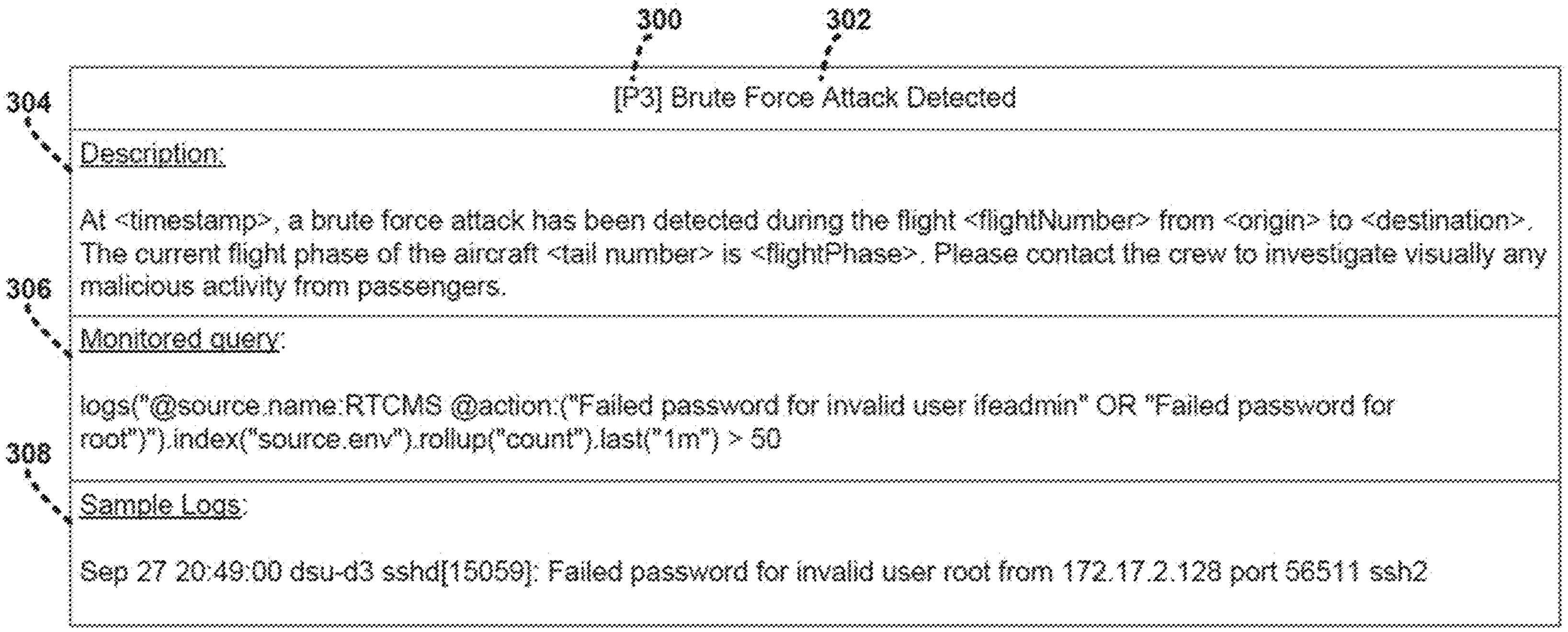
FIG. 4 illustrates an example of security alert notification in accordance with some embodiments of the present disclosure.

FIG. 4 illustrates an example of security alert notification generated by the security alert notifier 116 corresponding to cyber-attack scenario 1 from FIG. 2 and sent by email to airline. A security alert notification is mainly composed of a priority 300 indicating the severity score of the incident, a title 302 that uniquely identifies the type of security alert, a notification (message) field allowing markdown formatting and variables describing the security alert 304, the associated search query 306 and a sample 308 containing parts of logs relevant to the security alert, in accordance with some embodiments. Security alert notification can be sent to the airline carrier by email or through connected integrations (e.g., Jira, PagerDuty, Slack, Webhooks . . . ) and/or other application interface(s) or communication processes.

In some embodiments, when the security alert notification is sent to a first airline carrier operating the aircraft that reported the corresponding security log event, the IFE security correlation system 110 is configured to inform a second airline carrier, and may inform a plurality of other airline carriers, which is determined to operate similar inflight entertainment systems to what is operating in the aircraft that reported the security log event. Information can thereby be shared among the airline carrier businesses to enable federated learning of cyber-attack event occurrence and characteristics. The shared security alert notification may be anonymized to form a threat intelligence notification that does not specifically identify the affected aircraft (e.g., tail number), any passenger identifier, etc. Thus, for example, anonymization to generate the threat intelligence notification can include discarding or modifying any information that would enable identification of the impacted airline (e.g., flight schedule, etc.).

The IFE security correlation system 110 has been illustrated and described according to some embodiments with a small set of components for sake of simplicity and without limitation. In the illustrated example of FIG. 1, the IFE security correlation system 110 is hosted inside the ground-based CSOC 100 facility, but may be deployed elsewhere and may be deployed in a Cloud environment as a Software as a Service (Saas).

The security alerts and information generated from the reported security log event streams can be provided to airline user(s) through innovative informational interfaces which can include graphical user interface elements. A user-friendly dashboard reflecting the current cybersecurity status of the airline fleet and displaying security alert and threat intelligence notifications could be computer generated. By authenticating to a multi-tenant portal application, each airline can visualize its fleet on a geographic map with live monitoring status.

For example, the color of aircraft can indicate the current cyber status and more detailed information can be triggered for display responsive to user selection of an aircraft or other associated indicia, e.g., via hovering a mouse cursor over the displayed aircraft/indicia. In one embodiment, responsive to the user clicking-on or otherwise selecting an aircraft or other associated indicia, an aircraft live monitoring view can be displayed with flight status information, status of security controls, security events per host/IP represented in a table and LOPA (Layout of Passenger Accommodations). Responsive to the user clicking or otherwise selecting a row of the security events table or on a seat of the LOPA, more details are provided concerning security events, etc. The level of information can be very detailed especially when collected post-flight raw event log files are made available for deeper analysis.

Figure 5:
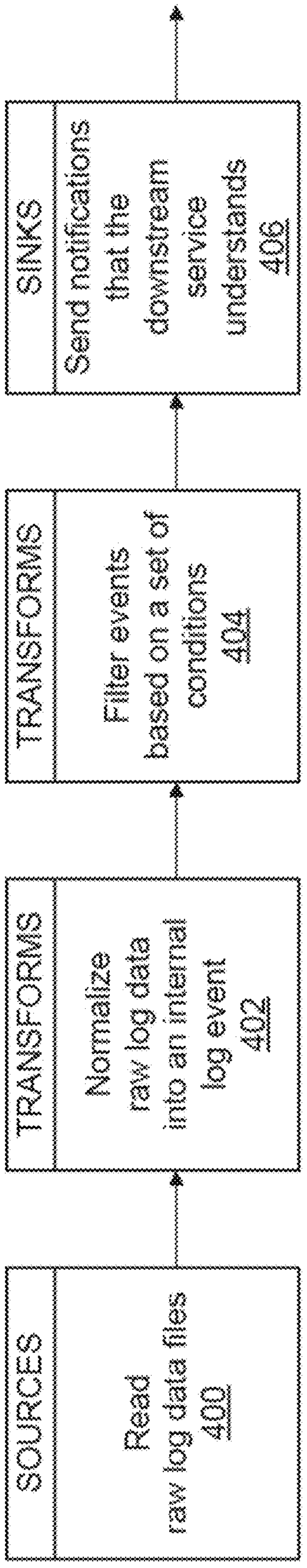
FIG. 5 illustrates a block diagram of processing operations performed by the aircraft-based IFE security observability system for collecting, processing, and routing observability data from aircraft to ground infrastructure of FIGS. 1 and 3 in accordance with some embodiments of the present disclosure.

FIG. 5 illustrates a block diagram of processing operations performed by the IFE security observability system 210, from collection of observability data to routing of the observability data to the ground-based IFE security correlation system 110 of FIGS. 1 and 3 in accordance with some embodiments of the present disclosure. The block diagram follows a high-level pipeline model based on three components (e.g., sources, transforms, and sinks). A source component performs operations to pull log event stream data from identified ones of the security log event stream modules 230A-H and operations to receive log event stream data pushed to it by various of the security log event stream modules 230A-H. A transform component performs operations to transform the log event stream data (e.g., parsing, filtering, sampling, aggregating). A sink component performs operations to condition the transformed log event stream data into a format compatible with or otherwise indicated for use by the downstream service it interacts with (e.g., the IFE security correlation system 110 or a component thereof). In some embodiments, the log event stream data flow is primarily or exclusively in one direction as illustrated, from sources to sinks. Each illustrated block is identified with the corresponding component responsible for performing the described processing operation.

Referring to FIG. 5, according to some embodiments the IFE security observability system 210 reads 400 content of identified (targeted) raw log data files to ingest observability data from sources (e.g., security log event stream modules 230A-H), where the list of sources can be defined in a configuration file of the configuration repository 216 in the IFE security observability system 210. The list of sources can be adapted responsive to commands generated by the ground-based IFE security correlation system 110. The IFE security observability system 210 can collect logs from various types of files, which can include: 1) log file source corresponding to the aircraft current position log file generated by the aircraft current position logger; and 2) multiple log file sources corresponding to the security raw event log files (e.g., from security log event stream modules 230A-H) to be processed by the security event notification correlator 114.

The aircraft current position logger can frequently query a flight data service. The flight data service manages and provides flight data to various components of the aircraft system 200. By receiving the response from the flight data service, the aircraft current position logger is then able to refresh flight information contained in the aircraft current position log file like navigation (e.g., latitude, longitude, altitude, heading, time to destination, timestamp), leg (e.g., flight number, departure airport, arrival airport) and phase (e.g., flight phase).

The IFE security observability system 210 transforms 402 (e.g., normalizes) the raw log data into an internal log event. The transform operations 402 can reduce complexity of the processing operations and provide more consistent processing of the raw log data by the IFE security correlation system 110 to monitor for security events that should trigger alerts and/or remedial actions. A log event can be a structured representation of a point-in-time event, and can contain a set of fields that describe the event. In some embodiments, a key tenet of the IFE security observability system 210 is to remain schema neutral. This ensures that the IFE security observability system 210 can work with any schema, supporting legacy and future schemas as needed. The IFE security observability system 210 can be configured to not require any specific fields, and each component can document in its output flow which fields it provides (includes in the output flow).

According to some embodiments, heartbeats and security log events have different schema, respectively named "rtcms/heartbeat" and "global/tech". In some embodiments, the heartbeat log event does not include "message" field, whereas the security log event always includes "message" field.

FIG. 6 illustrates an example schema "rtcms/heartbeat", which includes fields flightinfo (e.g., flight information from aircraft current position log file) and optionally further includes flightstatus (e.g., other information characterizing flight and system operations), that can be periodically reported from the IFE security observability system 210 to the IFE security correlation system 110.

FIG. 7 illustrates in more detail an example JSON object "FlightInformation". The example heartbeat JSON object may include, without limitation, any one or more of: flightId (flight id (unique per flight)); flightNumber (flight number (assigned to a flight by the airline)); origin (flight origin (ICAO airport code for the originating airport that the flight took off from)); destination (flight destination (ICAO airport code for the destination airport where the flight land)); time ToDestination (time to destination of this flight); flightphase (flight phase); latitude; longitude; altitude; heading; and groundSpeed (ground speed). The "rtcms/heartbeat" schema may include other parameters such as, without limitation, air state, ground state, engine operating state, operational status of the wireless and network connections, and/or other parameters that may correspond to parameters disclosed in the ARINC report 852.

FIG. 8 illustrates the schema "global/tech" for a logged security event notification, which may include fields message (free text describing the event) and filename.

The IFE security observability system 210 further transforms, e.g., filters, 404 events based on a set of conditions. The further transform (filter) processing operation can, in some embodiments, be performed only on security log events (not heartbeat notifications) since security log events are more verbose by nature compared to heartbeats. The condition that each of the input events is matched against depends on the value of field "filename". The condition checks for the presence of a string inside the field "message" to be symptomatic of a security meaningful entry for this type of "filename". If an event is matched by the condition, it is forwarded. Otherwise, the event is dropped. The condition for determining whether the string is symptomatic of a security meaningful entry for forwarding from the IFE security observability system 210 to the IFE security correlation system 110, can be adapted by the IFE security correlation system 110. The IFE security correlation system 110 may, for example, increase or decrease the range of notification (message) content (e.g., strings) that can satisfy the condition for forwarding. When the IFE security correlation system 110 determines based on content of logged security event notification or absence of receipt of heartbeat notification(s) that a possible attack is occurring, the IFE security correlation system 110 can adapt the forwarding condition used by the IFE security observability system 210 to decrease the number of dropped security log events and correspondingly increase the number of reported security log events, which enables more informed analysis to be performed by the IFE security correlation system 110.

To illustrate this processing operation, a high-level example is given to filter input events from the security raw event log file "SecLog_AV_01.log" corresponding to cyber-attack scenario 2 from FIG. 2. The "SecLog_AV_01.log" file contains all the information related to antivirus scans performed on content locations relative to passenger (PAX), crew and maintenance. This file contains pertinent details for each of the scans performed during a flight. The log will include the antivirus engine version, scan source and results (e.g., OK, NOK). Additionally, the name of the scanning service along with PID (Process IDentifier) is captured. If a virus is not found the results will display, "virus found 0—OK" along with the host location (e.g., seat video display unit, cabin-crew terminal, etc.) and timestamp information. If a virus is found, the log will display a "NOK" with all of the pertinent obtained and generated information related to the scan. Due to the high costs associated with the communications satellite 28 and to avoid sending non-critical security event notification to the ground, only events with field "message" containing the string "NOK" are forwarded, whereas the others are dropped, in accordance with some embodiments.

The IFE security observability system 210 sends 406 notifications that are formatted and conditioned for compatibility with and processing by the downstream service (e.g., notification stream collector 112, security event notification correlator 114, and security alert notifier 116). Notifications are sent from the aircraft to the ground. All events must share the same overall structure. Notifications are implemented via JSON objects in a format that is understood natively by the downstream service, in this case the ground-based notification stream collector 112.

FIG. 9 illustrates example fields defined for the heartbeat and security event notifications in accordance with some embodiments. The fields can include, without limitation, the following: "v" (version number); "scheme" (identifies version of schema for notification (message) payload); "level" (indicates severity level of log event); "sec" (indicates if the notification is a security log); "timestamp" (exact time at which the log event was produced); "source" (information related to source of the event, e.g., the application or service that generated the event); "source.airline" (identifies in the airline, e.g., according to ICAO standard); "source.env" (name of the environment, e.g., aircraft tail number on which event is reported); "source.id" (unique identifier of the source, e.g., uuid of the application, instanceid for docker and kubernetes environments, hostmane for server, etc.); "source.name" (unique human readable name identifying the source); "source.version" (version of the source); and "data" (event log payload which can be defined by "type").

Some fields are common in the heartbeat and security event notifications (e.g., timestamp, tail number) to enable event notification correlation operations therebetween on the ground by the security event notification correlator 114. Example correlation of a heartbeat and a security log event is now explained at a high-level corresponding to the cyber-attack scenario 3 from FIG. 2. The IFE content server 20 can be equipped with a maintenance port (e.g., RJ45 port) to allow a technician to connect a laptop for maintenance purposes. Maintenance operations are scheduled only when the aircraft is on the ground. For this reason, if connection is detected on the maintenance port of the IFE content server 20 (determined from information in a security log event) while the aircraft is flying (determined from information in a heartbeat log event), a security attack risk is identified since unexpected maintenance port access to the IFE content server 20 is occurring during flight. A responsive security alert is triggered by the security event notification correlator 114.

Thus, in some embodiments, the aircraft-based IFE security observability system 210 can be configured to generate a security event notification responsive to determining that an electronic device has been connected to a maintenance port of an element of the IFE system during a time when a maintenance operation is not scheduled to occur.

Corresponding detailed example operations by the security event notification correlator 114 can include use of a search query including two facets: "connection to maintenance port" (this event attribute is linked to an action); and "cruise" (this event attribute is linked to a flight status). The two facets are combined in the search query by using an "AND" Boolean operator. Then some alert conditions are applied which may include the number of occurrences when connection happened during a period of time per "tail number" (i.e. per aircraft). In this example, the number of occurrences is defined as "1" and the period of time to "Xm" (as an heartbeat notification is sent to the ground every X minutes). This correlation rule will automatically trigger a security alert relative to an illegitimate connection to the maintenance port when the aircraft is flying, whereas no security alert would be triggered by the connection if it happened when the aircraft is on the ground.

However, in some other embodiments, the correlation rule may trigger a security alert by a connection when the aircraft is on the ground, if certain other conditions are determined, which can include correlating a connection occurring while passengers are present onboard the aircraft (e.g., before disembarking completely at gate and/or after beginning boarding at gate). Still, in some other embodiments, the correlation rule may trigger a security alert by a connection when the aircraft is on the ground, if still other conditions are determined, which can include correlating a connection occurring at a time of day when no maintenance is scheduled or otherwise expected to occur.

FIG. 10 illustrates example content of a heartbeat notification, where the content items can be interpreted based on the definitions provided in FIGS. 6, 7, and 9.

FIG. 11 illustrates example content of a security event notification, where the content items can be interpreted based on the definitions provided in FIGS. 8 and 9.

Numerous embodiments have been described in the context of the non-limiting example configurations of FIGS. 1-11. These and other embodiments are not limited to these example configurations. More general embodiments are now described with reference to FIGS. 12 and 13.

Figure 12:
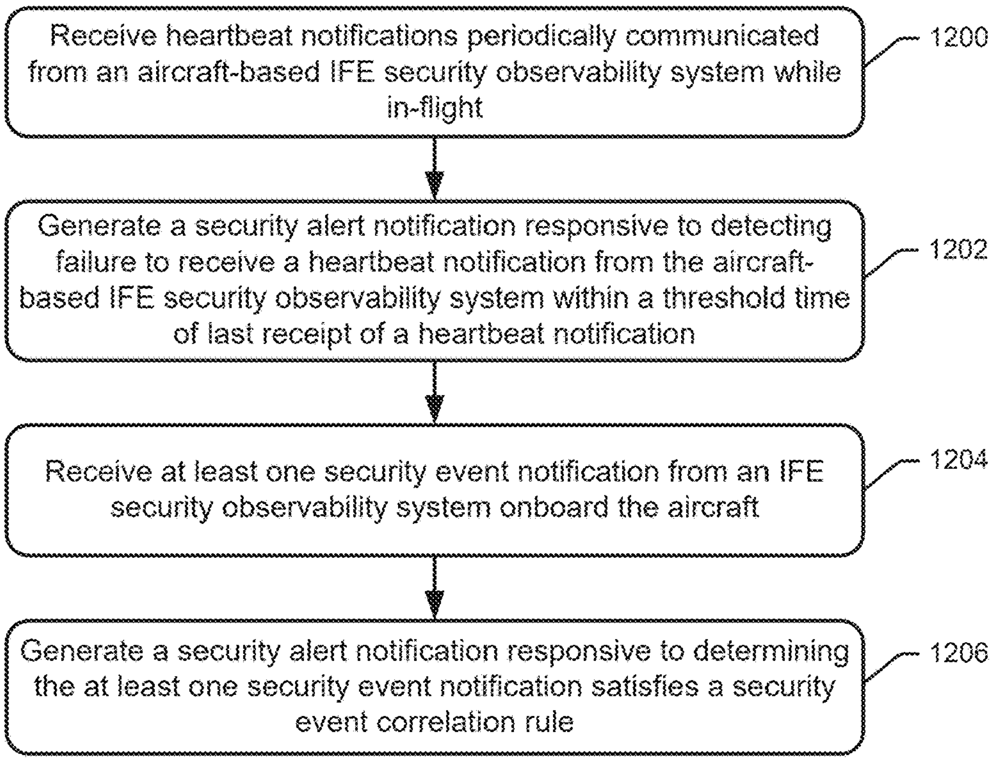
FIG. 12 illustrates a flowchart of operations that can be performed by a ground-based IFE security correlation system in accordance with some embodiments.
Figure 13:
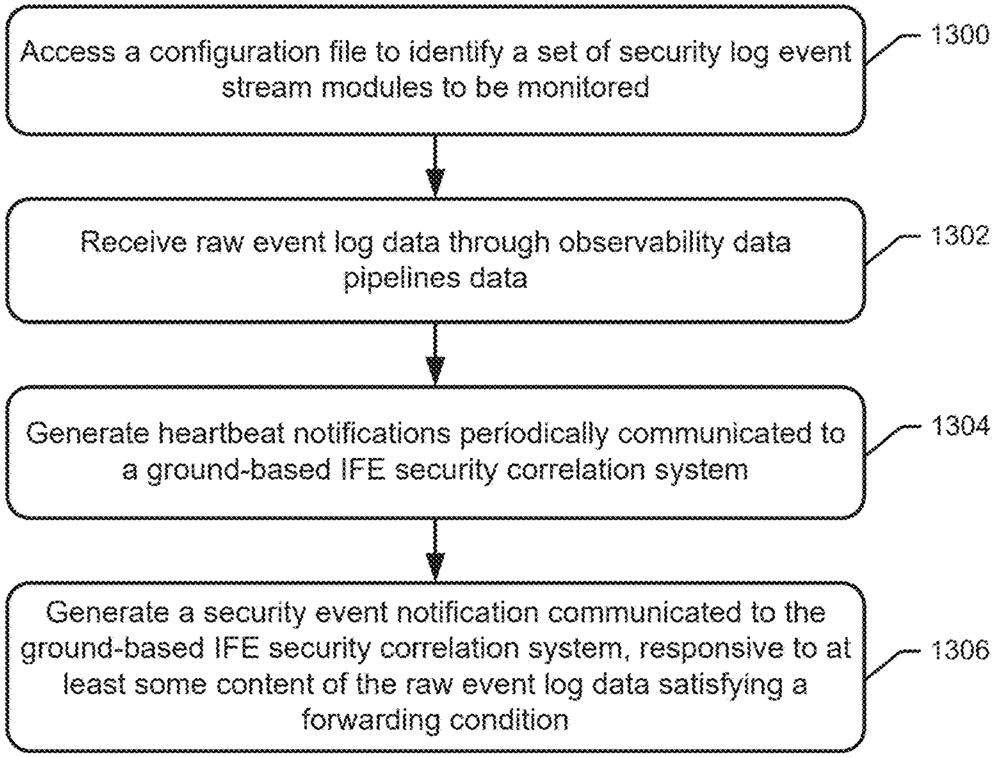
FIG. 13 illustrates a flowchart of operations that can be performed by an aircraft-based IFE security observability system in accordance with some embodiments.

FIG. 12 illustrates a flowchart of operations that can be performed by a ground-based IFE security correlation system in accordance with some embodiments. FIG. 13 illustrates a flowchart of operations that can be performed by an aircraft-based IFE security observability system in accordance with some embodiments.

Referring initially to FIG. 13, the aircraft-based IFE security observability system includes at least one processor and at least one memory storing instructions executable by the at least one processor to perform operations. The operations include to access 1300 a configuration file to identify a set of security log event stream modules to be monitored within at least one of: an IFE content server, a passenger display unit, a passenger electronic device, a cabin-crew terminal, a network distribution component, and a satellite connectivity server. The operations receive 1302 raw event log data through observability data pipelines data from the set of security log event stream modules. The operations generate 1304 heartbeat notifications periodically communicated to a ground-based IFE security correlation system. The operations generate 1306 a security event notification communicated to the ground-based IFE security correlation system, responsive to at least some content of the raw event log data satisfying a forwarding condition.

The heartbeat notifications may contain flight information that enables the ground-based IFE security correlation system to better assess risk of a security event when a heartbeat notification is not timely received.

For example, the operations by the aircraft-based IFE security observability system may include to obtain flight information from an aircraft current position log and information characterizing flight and system operations, and to generate the heartbeat notifications to include indications based on the flight information from the aircraft current position log and based on the flight and system operations.

The operations by the aircraft-based IFE security observability system may include to obtain information indicating a flight identifier for the present aircraft flight, a time to destination of the flight, a geographic location of the aircraft, a flight phase indication, and engine operating state. The operations can then include to generate the security event notification to include the information and at least some content of the raw event log data that satisfied the forwarding condition.

The operations by the aircraft-based IFE security observability system may include to determine that some content of the raw event log data satisfies the forwarding condition based on determining a result of an antivirus engine scan on a host element of the IFE system indicates presence of a virus. The operations can then include, responsive to the determination, to generate the security event notification to include an identifier of the host element of the IFE system and an identifier of the antivirus engine.

Referring now to FIG. 12, the ground-based IFE security correlation system includes at least one processor and at least one memory storing instructions executable by the at least one processor to perform operations. The operations include to receive 1200 heartbeat notifications periodically communicated from an aircraft-based IFE security observability system while in-flight. The operations generate 1202 a security alert notification responsive to detecting failure to receive a heartbeat notification from the aircraft-based IFE security observability system within a threshold time of last receipt of a heartbeat notification. The operations may further include to receive 1204 at least one security event notification from an IFE security observability system onboard the aircraft, and to generate 1206 a security alert notification responsive to determining the at least one security event notification satisfies a security event correlation rule.

When the ground-based IFE security correlation system does not timely received a heartbeat notification from an aircraft, this may indicate that a security event is occurring on the aircraft but may alternatively be due to loss of or poor SATCOM connectivity. Some embodiments of the present disclosure are therefore directed to the aircraft-based IFE security observability system including an indication of a SATCOM connectivity quality metric generated based on, for example, communications measurements performed by the SATCOM transceiver 24. The ground-based IFE security correlation system can use the reported SATCOM connectivity quality metric(s) to adjust what conditions associated with failure to timely receive heartbeat notification(s) from an aircraft trigger generate of a security event notification.

In some embodiments, the SATCOM connectivity quality metrics reported by aircraft are stored along with reported aircraft locations into a repository, which can then be used as a machine learning function to enable the ground-based IFE security correlation system to estimate or predict when an aircraft at a known location can experience no SATCOM connectivity or insufficient SATCOM connectivity quality. In one embodiment, the operations by the ground-based IFE security correlation system may include to obtain aircraft location from a previously received one of the heartbeat notifications, and retrieve a SATCOM connectivity quality metric from the repository using the aircraft location. When the SATCOM connectivity quality metric violates a threshold quality rule, the operations prevent generation of a security event notification responsive to detecting failure to receive a heartbeat notification from the aircraft-based IFE security observability system within the threshold time of last receipt of a heartbeat notification. In contrast, when the SATCOM connectivity quality metric does not violate the threshold quality rule, the operations generate a security event notification responsive to detecting failure to receive a heartbeat notification from the aircraft-based IFE security observability system within the threshold time of last receipt of a heartbeat notification.

The ground-based IFE security correlation system may learn from earlier aircraft reported SATCOM connectivity quality metrics where SATCOM connectivity can be expected to be absent or of insufficient quality to enable or sustain aircraft connectivity for the ground-based IFE security correlation system to receive heartbeat notifications. Accordingly, in some embodiments, the operations by the ground-based IFE security correlation system may obtain aircraft reported SATCOM connectivity quality metrics and corresponding aircraft locations in at least some of the heartbeat notifications received from a plurality of aircraft. The operations can then update the repository using the aircraft reported SATCOM connectivity quality metrics and the corresponding aircraft locations.

As explained above, although absence of periodic heartbeat notifications from an aircraft being received can indicate a security event is occurring in the aircraft IFE system, such absence can also occur from loss of SATCOM connectivity with the aircraft and while SATCOM connectivity quality is insufficient to support reliable and timely transport of the heartbeat notifications. Some further embodiments are therefore directed to use of SATCOM connectivity quality and other conditions to adjust the threshold time that a heartbeat notification from the aircraft must arrive within since a last reception, before the ground-based IFE security correlation system responsively generates a security event notification. These operations may reduce the number of security event notifications that are generated and/or reduce how often security event notifications incorrectly indicate a cybersecurity or other attack is occurring onboard the aircraft.

The operations may extend the threshold time before the aircraft enters a region where loss of SATCOM connectivity with the aircraft is predicted to occur, and/or may extend the threshold time responsive to aircraft reported reported SAT- COM connectivity quality metrics indicating that loss of SATCOM connectivity with the aircraft is sufficiently likely to occur.

In some embodiments, the operations by the ground-based IFE security correlation system obtain aircraft reported SATCOM connectivity quality metrics for a present aircraft location and a series of future aircraft locations along a registered flight route of the aircraft. The operations estimate, based on the obtained aircraft reported SATCOM connectivity quality metrics, a time duration during which SATCOM connectivity with the aircraft will have insufficient quality for receipt of a heartbeat notification. The operations then adjust the threshold time based on the estimate of the time duration.

In a further embodiment, for the future aircraft locations in an elementary area with no aircraft reported SATCOM connectivity quality metrics available in the repository, the operations estimate the time duration during which SATCOM connectivity with the aircraft will have insufficient quality for receipt of a heartbeat notification data, based on extrapolating using one or more closest elementary area(s) having aircraft reported SATCOM connectivity quality metrics available in the repository.

In some other embodiments, the operations by the ground-based IFE security correlation system to generate a security alert notification include to obtain an aircraft reported SATCOM connectivity quality metric from a previously received one of the heartbeat notifications, and adjust the threshold time based on comparison of the SATCOM connectivity quality metric to a threshold quality.

In a further embodiment, the operations by the ground-based IFE security correlation system to adjust the threshold time include to increase the threshold time based on determining the SATCOM connectivity quality metric is less than the threshold quality, and to decrease the threshold time based on determining the SATCOM connectivity quality metric is greater than the threshold quality.

In a further embodiment, the operations by the ground-based IFE security correlation system include to determine a trend over time in aircraft reported SATCOM connectivity quality metrics from a sequence of the heartbeat notifications received from the aircraft. The operations estimate, based on the trend over time, a time duration during which SATCOM connectivity with the aircraft will remain insufficient for receipt of a heartbeat notification. The operations then adjust the threshold time based on the estimate of the time duration.

Security alert notifications may be generated when an unexpected rapid change in aircraft flight information (e.g., altitude, heading, route, etc.) is detected and/or an excessive deviation from registered flight route from is detected.

In some other embodiments, the operations by the ground-based IFE security correlation system include to obtain aircraft flight information including at least aircraft speed, altitude, and heading from received one of the heartbeat notifications. The operations then generate a security alert notification responsive to detecting that a security rule is violated by an amount of change in the aircraft flight information obtained from two successive ones of the heartbeat notifications.

In some other embodiments, the operations by the ground-based IFE security correlation system include to obtain aircraft flight information including at least altitude, heading, and location from received one of the heartbeat notifications. The operations then generate a security alert notification responsive to detecting that a security rule is violated by an amount of deviation between the aircraft flight information obtained from one of the heartbeat notifications relative to a registered flight plan for the aircraft.

When several heartbeat notifications are not received, the ground-based IFE security correlation system may attempt to reconfigure SATCOM connectivity with the aircraft through, e.g., communication operation changes to the satellite(s) serving the aircraft, to the aircraft SATCOM transceiver 24, etc.

In some other embodiments, the operations by the ground-based IFE security correlation system include, responsive to detecting continued failure to receive a heartbeat notification from the aircraft-based IFE security observability system within a second threshold time, to communicate a command to reconfigure SATCOM connectivity with the aircraft. The operation to reconfigure the SATCOM connectivity can include at least one of: cause a change of satellite channel modulation and coding scheme used for SATCOM communications with the aircraft; cause a change of a satellite beam boundary used for SATCOM connection with the aircraft; cause a change of satellite beam power level serving the aircraft; and cause handover of the SATCOM communications with the aircraft from one satellite to another satellite.

In some other embodiments, the operations by the ground-based IFE security correlation system include, responsive to detecting continued failure to receive a heartbeat notification from the aircraft-based IFE security observability system within a second threshold time, to communicate a command to change a traffic shaping policy including increasing a priority level used for handling heartbeat notifications communicated by the aircraft through a satellite network.

In some other embodiments, the operations by the ground-based IFE security correlation system to generate a security alert notification include to obtain an indication of weather event in a region corresponding to location of the aircraft, and to adjust the threshold time based on the indication of weather.

In a further embodiment, the operations obtain indications of weather events in a region corresponding to a present aircraft location and a series of future aircraft locations along a registered flight route of the aircraft. The operations then estimate, based on the indications of weather, a time duration during which SATCOM connectivity with the aircraft will have insufficient quality for receipt of a heartbeat notification. The operations then adjust the threshold time based on the estimate of the time duration.

In some other embodiments, the operations by the ground-based IFE security correlation system to generate a security alert notification include to obtain from at least one previously received heartbeat notification, a satellite handover indication indicating that a satellite handover is being initiated or will be initiated within a threshold time. The operations then adjust the threshold time based on the satellite handover indication.

For example, heartbeat notification may report time since last SATCOM beam handover event and an average time between the satellite cell handover events. The threshold time for triggering a security alert notification can be adjusted based on the time since last SATCOM beam handover event and the average time between the satellite cell handover events, to compensate for possible loss of SATCOM connectivity during handover between satellite cell handovers.

In another embodiment, SATCOM connectivity quality measurements are included in heartbeat notifications responsive to a handover event indicating handover from one satellite to another satellite. For example, a security log event stream module and/or the IFE security observability system may poll or be informed by an onboard SATCOM modem or a module communicatively connected to the SATCOM modem that a satellite handover is being initiated or will be initiated within a threshold time.

In another embodiment, SATCOM connectivity quality measurements are included in heartbeat notifications responsive to determining an elevation angle of a satellite presently providing a communication link for the onboard SATCOM modem and antenna satisfies a defined rule. For example, responsive to while the satellite elevation angle is less than a defined threshold, where the threshold may be defined to be associated with anticipated lower QoS connectivity leading up to and during the handover processes, the SATCOM connectivity quality measurements can included in heartbeat notifications.

Some further embodiments are directed to ensuring compliance with governmental regulations and requirements having jurisdiction over where relevant data is received on the ground, stored, and/or processed. For example, the ground-based IFE security correlation system may be hosted in various different countries, or in cloud resources that may be moved between countries to be more geographically local to the present route or typical route of an aircraft. In some embodiments, the ground-based IFE security correlation system may send commands to the aircraft-based IFE security observability system which adapt what type of information is reported by aircraft in raw event log data pipelines and/or heartbeat notifications, based on the aircraft's location and/or where data reported by the aircraft is received on the ground (e.g., satellite ground gateway transceiver), stored, and/or processed to support analysis and generation of security alert notification(s). For example, while an aircraft is within airspace of a country having regulations that prohibit collection and transmission of a particular type of information without prior-authorization, the ground-based IFE security correlation system may send a notification to the aircraft that causes the aircraft-based IFE security observability system to not collect and/or to not report that type of information while the aircraft remains in that airspace.

In a further embodiment, when the aircraft-based IFE security observability system generates a security event notification and/or it is commanded through a message from the ground-based IFE security correlation system (e.g., responsive to generating a security alert notification), the aircraft-based IFE security observability system may trigger a camera located at a seat or other location in the cabin which is correlated to being associated with a security event to record video. In this manner, the aircraft-based IFE security observability system may collect and temporarily store video that captures a passenger's activity which may be relevant to the security event. The video may be temporarily stored onboard the aircraft and then deleted if, for example, a CALEA or other government request for access to the video is not received within a threshold time after capture.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A ground-based in-flight entertainment (IFE) security correlation system comprising:
- at least one processor;
- at least one memory storing instructions executable by the at least one processor to perform operations comprising to:
- receive heartbeat notifications periodically communicated from an aircraft-based IFE security observability system while in-flight; and
- generate a security alert notification responsive to detecting failure to receive a heartbeat notification from the aircraft-based IFE security observability system within a threshold time of last receipt of a heartbeat notification.

2. The ground-based IFE security correlation system of claim 1, wherein the operations further comprise to:
- receive at least one security event notification from an IFE security observability system onboard the aircraft;
- generate a security alert notification responsive to determining the at least one security event notification satisfies a security event correlation rule.

3. The ground-based IFE security correlation system of claim 1, wherein the operation to generate a security alert notification responsive to detecting failure to receive a heartbeat notification from the aircraft-based IFE security observability system within the threshold time of last receipt of a heartbeat notification, comprises to:
- obtain aircraft location from a previously received one of the heartbeat notifications;
- retrieve a SATCOM connectivity quality metric from the repository using the aircraft location;
- when the SATCOM connectivity quality metric violates a threshold quality rule, prevent generation of a security alert notification responsive to detecting failure to receive a heartbeat notification from the aircraft-based IFE security observability system within the threshold time of last receipt of a heartbeat notification; and
- when the SATCOM connectivity quality metric does not violate the threshold quality rule, generate a security alert notification responsive to detecting failure to receive a heartbeat notification from the aircraft-based IFE security observability system within the threshold time of last receipt of a heartbeat notification.

4. The ground-based IFE security correlation system of claim 3, wherein the operations further comprise to:
- obtain aircraft reported SATCOM connectivity quality metrics and corresponding aircraft locations in at least some of the heartbeat notifications received from a plurality of aircraft; and
- update the repository using the aircraft reported SATCOM connectivity quality metrics and the corresponding aircraft locations.

5. The ground-based IFE security correlation system of claim 4, wherein the operations further comprise to:
- obtain aircraft reported SATCOM connectivity quality metrics for a present aircraft location and a series of future aircraft locations along a registered flight route of the aircraft;
- estimate, based on the obtained aircraft reported SATCOM connectivity quality metrics, a time duration during which SATCOM connectivity with the aircraft will have insufficient quality for receipt of a heartbeat notification; and
- adjust the threshold time based on the estimate of the time duration.

6. The ground-based IFE security correlation system of claim 5, wherein the operations further comprise to:
- for the future aircraft locations in an elementary area with no aircraft reported SATCOM connectivity quality metrics available in the repository, operations estimate the time duration during which SATCOM connectivity with the aircraft will have insufficient quality for receipt of a heartbeat notification data, based on extrapolating using one or more closest elementary area(s) having aircraft reported SATCOM connectivity quality metrics available in the repository.

7. The ground-based IFE security correlation system of claim 1, wherein the operation to generate a security alert notification responsive to detecting failure to receive a heartbeat notification from the aircraft-based IFE security observability system within the threshold time of last receipt of a heartbeat notification, comprises to:

obtain an aircraft reported SATCOM connectivity quality metric from a previously received one of the heartbeat notifications; and adjust the threshold time based on comparison of the SATCOM connectivity quality metric to a threshold quality.

8. The ground-based IFE security correlation system of claim 7, wherein the operation to adjust the threshold time based on comparison of the SATCOM connectivity quality metric to the threshold quality, comprises to:

increase the threshold time based on determining the SATCOM connectivity quality metric is less than the threshold quality; and decrease the threshold time based on determining the SATCOM connectivity quality metric is greater than the threshold quality.

9. The ground-based IFE security correlation system of claim 7, wherein the operations further comprise to:

determine a trend over time in aircraft reported SATCOM connectivity quality metrics from a sequence of the heartbeat notifications received from the aircraft;

estimate, based on the trend over time, a time duration during which SATCOM connectivity with the aircraft will remain insufficient for receipt of a heartbeat notification; and adjust the threshold time based on the estimate of the time duration.

10. The ground-based IFE security correlation system of claim 1, wherein the operations further comprise to:

obtain aircraft flight information including at least aircraft speed, altitude, and heading from received one of the heartbeat notifications; and generate a security alert notification responsive to detecting that a security rule is violated by an amount of change in the aircraft flight information obtained from two successive ones of the heartbeat notifications.

11. The ground-based IFE security correlation system of claim 1, wherein the operations further comprise to:

obtain aircraft flight information including at least altitude, heading, and location from received one of the heartbeat notifications; and generate a security alert notification responsive to detecting that a security rule is violated by an amount of deviation between the aircraft flight information obtained from one of the heartbeat notifications relative to a registered flight plan for the aircraft.

12. The ground-based IFE security correlation system of claim 1, wherein the operations further comprise to:

responsive to detecting continued failure to receive a heartbeat notification from the aircraft-based IFE security observability system within a second threshold time, communicating a command to reconfigure SATCOM connectivity with the aircraft, wherein the reconfiguration of the SATCOM connectivity comprises at least one of: cause a change of satellite channel modulation and coding scheme used for SATCOM communications with the aircraft; cause a change of a satellite beam boundary used for SATCOM connection with the aircraft; cause a change of satellite beam power level serving the aircraft; and cause handover of the SATCOM communications with the aircraft from one satellite to another satellite.

13. The ground-based IFE security correlation system of claim 1, wherein the operations further comprise to:

responsive to detecting continued failure to receive a heartbeat notification from the aircraft-based IFE security observability system within a second threshold time, communicating a command to change a traffic shaping policy including increasing a priority level used for handling heartbeat notifications communicated by the aircraft through a satellite network.

14. The ground-based IFE security correlation system of claim 1, wherein the operation to generate a security alert notification responsive to detecting failure to receive a heartbeat notification from the aircraft-based IFE security observability system within the threshold time of last receipt of a heartbeat notification, comprises to:

obtain an indication of weather event in a region corresponding to location of the aircraft; and adjust the threshold time based on the indication of weather.

15. The ground-based IFE security correlation system of claim 14, wherein the operations further comprise to:

obtain indications of weather events in a region corresponding to a present aircraft location and a series of future aircraft locations along a registered flight route of the aircraft;

estimate, based on the indications of weather, a time duration during which SATCOM connectivity with the aircraft will have insufficient quality for receipt of a heartbeat notification; and adjust the threshold time based on the estimate of the time duration.

16. The ground-based IFE security correlation system of claim 1, wherein the operation to generate a security alert notification responsive to detecting failure to receive a heartbeat notification from the aircraft-based IFE security observability system within the threshold time of last receipt of a heartbeat notification, comprises to:

obtain from at least one previously received heartbeat notification, a satellite handover indication indicating that a satellite handover is being initiated or will be initiated within a threshold time; and adjust the threshold time based on the satellite handover indication.

17. The ground-based IFE security correlation system of claim 1, wherein the operations further comprise to:

generate a threat intelligence notification based on anonymizing content of the security alert notification to not identify the affected aircraft; and communicate the threat intelligence notification to at least one airline carrier other than an airline carrier owning the affected aircraft.

18. An aircraft-based in-flight entertainment (IFE) security observability system comprising:

at least one processor;

at least one memory storing instructions executable by the at least one processor to perform operations comprising to:

access a configuration file to identify a set of security log event stream modules to be monitored within at least one of: an IFE content server, a passenger display unit, a passenger electronic device, a cabin-crew terminal, a network distribution component, and a satellite connectivity server;

receive raw event log data through observability data pipelines data from the set of security log event stream modules;

generate heartbeat notifications periodically communicated to a ground-based IFE security correlation system; and generate a security event notification communicated to the ground-based IFE security correlation system, responsive to at least some content of the raw event log data satisfying a forwarding condition.

19. The aircraft-based IFE security observability system of claim 18, wherein the operations further comprise to:

obtain flight information from an aircraft current position log and information characterizing flight and system operations; and generate the heartbeat notifications to include indications based on the flight information from the aircraft current position log and based on the flight and system operations.

20. The aircraft-based IFE security observability system of claim 18, wherein the operations further comprise to:

obtain information indicating a flight identifier for the present aircraft flight, a time to destination of the flight, a geographic location of the aircraft, a flight phase indication, and engine operating state; and generate the security event notification to include the information and at least some content of the raw event log data that satisfied the forwarding condition.

21. The aircraft-based IFE security observability system of claim 18, wherein the operations further comprise to:

determine that some content of the raw event log data satisfies the forwarding condition based on determining a result of an antivirus engine scan on a host element of the IFE system indicates presence of a virus; and responsive to the determination, generate the security event notification to include an identifier of the host element of the IFE system and an identifier of the antivirus engine.

22. The aircraft-based IFE security observability system of claim 18, wherein the operations further comprise to:

generate the security event notification responsive to determining that an electronic device has been connected to a maintenance port of an element of the IFE system during a time when a maintenance operation is not scheduled to occur.

23. The aircraft-based IFE security observability system of claim 18, wherein the operations further comprise to:

retain heartbeat notifications and security event notifications, in an onboard buffer memory, which were generated when no SATCOM connectivity is available for communications to the ground-based IFE security correlation system; and responsive to SATCOM connectivity becoming available, retrieving the heartbeat notifications and security event notifications from the onboard buffer memory and communicating to the ground-based IFE security correlation system.

24. The aircraft-based IFE security observability system of claim 18, wherein, responsive to SATCOM connectivity becoming available, the operation to retrieve the heartbeat notifications from the onboard buffer memory and communicate to the ground-based IFE security correlation system comprises to:

combine the retrieved heartbeat notifications into a single notification for communication to the ground-based IFE security correlation system; and include in the single notification an indication of measurements of SATCOM connectivity bandwidth taken during a time duration in which the heartbeat notifications were retained in the onboard buffer memory awaiting communication offboard.

* * * * *